US012512075B2

(12) United States Patent
Fu et al.

(10) Patent No.: US 12,512,075 B2
(45) Date of Patent: Dec. 30, 2025

(54) ELECTRONIC DEVICE

(71) Applicant: InnoLux Corporation, Miao-Li County (TW)

(72) Inventors: Syue-Ling Fu, Miao-Li County (TW); Yeh-Yi Lan, Miao-Li County (TW); Cheng-Cheng Pan, Miao-Li County (TW); Meng-Kun Tsai, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 223 days.

(21) Appl. No.: 18/451,345

(22) Filed: Aug. 17, 2023

(65) Prior Publication Data

US 2024/0105136 A1 Mar. 28, 2024

(30) Foreign Application Priority Data

Sep. 27, 2022 (CN) ......................... 202211182667.9

(51) Int. Cl.
*G09G 3/36* (2006.01)

(52) U.S. Cl.
CPC ......... *G09G 3/3607* (2013.01); *G09G 3/3696* (2013.01); *G09G 2320/0252* (2013.01); *G09G 2320/0673* (2013.01); *G09G 2340/16* (2013.01)

(58) Field of Classification Search
CPC ............... G09G 3/3607; G09G 3/3696; G09G 2320/0252; G09G 2320/0673; G09G 2340/16; G09G 3/20; G09G 3/36
See application file for complete search history.

(56) References Cited

U.S. PATENT DOCUMENTS 9,159,278 B2 10/2015 Huang
2012/0057112 A1* 3/2012 Ke .................... G02F 1/134363 349/114

(Continued)

FOREIGN PATENT DOCUMENTS

CN 102456313 A 5/2012
CN 103474042 A 12/2013

(Continued)

OTHER PUBLICATIONS

Chinese language office action dated Sep. 26, 2025, issued in application No. 202211182667.9.

*Primary Examiner* — Matthew A Eason
*Assistant Examiner* — Chayce R Bibbee
(74) *Attorney, Agent, or Firm* — McClure, Qualey & Rodack, LLP

(57) ABSTRACT

An electronic device includes a display unit, a voltage generation unit, a grayscale adjustment unit, and an over-driving unit. The display unit has a relationship curve between the transmittance and the driving voltage. The relationship curve has a predetermined voltage value corresponding to the maximum transmittance. The voltage generation unit generates a first voltage according to a first grayscale, and generates a second voltage according to a second grayscale. The grayscale adjustment unit receives a first display grayscale value, and outputs the second grayscale when the first display grayscale value is equal to the first grayscale. The overdriving unit overdrives the second voltage corresponding to the second grayscale to obtain a first target driving voltage, and it provides the first target driving voltage to the display unit.

20 Claims, 5 Drawing Sheets

(56) References Cited

U.S. PATENT DOCUMENTS

| | | | | |
|---|---|---|---|---|
| 2012/0092387 | A1 | 4/2012 | Yang et al. | |
| 2015/0070410 | A1* | 3/2015 | Huang | G09G 3/3607<br>345/691 |

FOREIGN PATENT DOCUMENTS

| | | | |
|---|---|---|---|
| CN | 110085177 | A | 8/2019 |
| WO | 2012081212 | A1 | 6/2012 |

* cited by examiner

310C

500T

| display grayscale | voltage |
|---|---|
| 255 | 14.3(T99) |
| 200 | 8.856 |
| 127 | 6.45 |
| 63 | 5.48 |
| 1 | 2.98 |
| 0 | 0.5 |

130T

| display grayscale | voltage |
|---|---|
| 255 | 15(V101) |
| 200 | 14.3(V99) |
| 127 | 6.45 |
| 63 | 5.48 |
| 1 | 0.5(V1) |
| 0 | 0.2(V0) |

ELECTRONIC DEVICE

CROSS REFERENCE TO RELATED APPLICATIONS

This application claims the benefit of China Application No. 202211182667.9, filed on Sep. 27, 2022, the entirety of which is incorporated by reference herein.

BACKGROUND OF THE DISCLOSURE

Field of the Invention

The present invention relates to an electronic device, and, in particular, to an electronic device to improve response time during grayscale adjustment.

Description of the Related Art

In existing liquid-crystal display technology, the display usually includes an overdriving unit. Overdrive is a commonly used technique to speed up the response time during grayscale adjustments. Generally speaking, a grayscale corresponds to a driving voltage, and the higher the grayscale, the higher the corresponding driving voltage. Therefore, when overdrive is applied, if the display grayscale corresponds to a predetermined driving voltage, the overdriving unit will overdrive the display grayscale with another voltage that is higher than the predetermined driving voltage instead of directly driving with the predetermined driving voltage.

However, when the display grayscale is the highest grayscale that can be adjusted in the display (and hence the setting of the display does not have a higher grayscale than the display grayscale), the overdriving unit cannot overdrive the display grayscale with another voltage that is higher than the predetermined driving voltage. Therefore, existing overdrive technology cannot be applied in situations where the display grayscale is the highest grayscale or the lowest grayscale.

BRIEF SUMMARY OF THE DISCLOSURE

An embodiment of the present disclosure provides an electronic device. The electronic device includes a display unit, a voltage generation unit, a grayscale adjustment unit, and an overdriving unit. The display unit has a relationship curve between the transmittance and the driving voltage. The relationship curve has a predetermined voltage value corresponding to the maximum transmittance. The voltage generation unit generates a first voltage according to a first grayscale, and generates a second voltage according to a second grayscale. The grayscale adjustment unit receives a first display grayscale value, and outputs the second grayscale when the first display grayscale value is equal to the first grayscale. The overdriving unit overdrives the second voltage corresponding to the second grayscale to obtain a first target driving voltage, and provide the first target driving voltage to the display unit.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
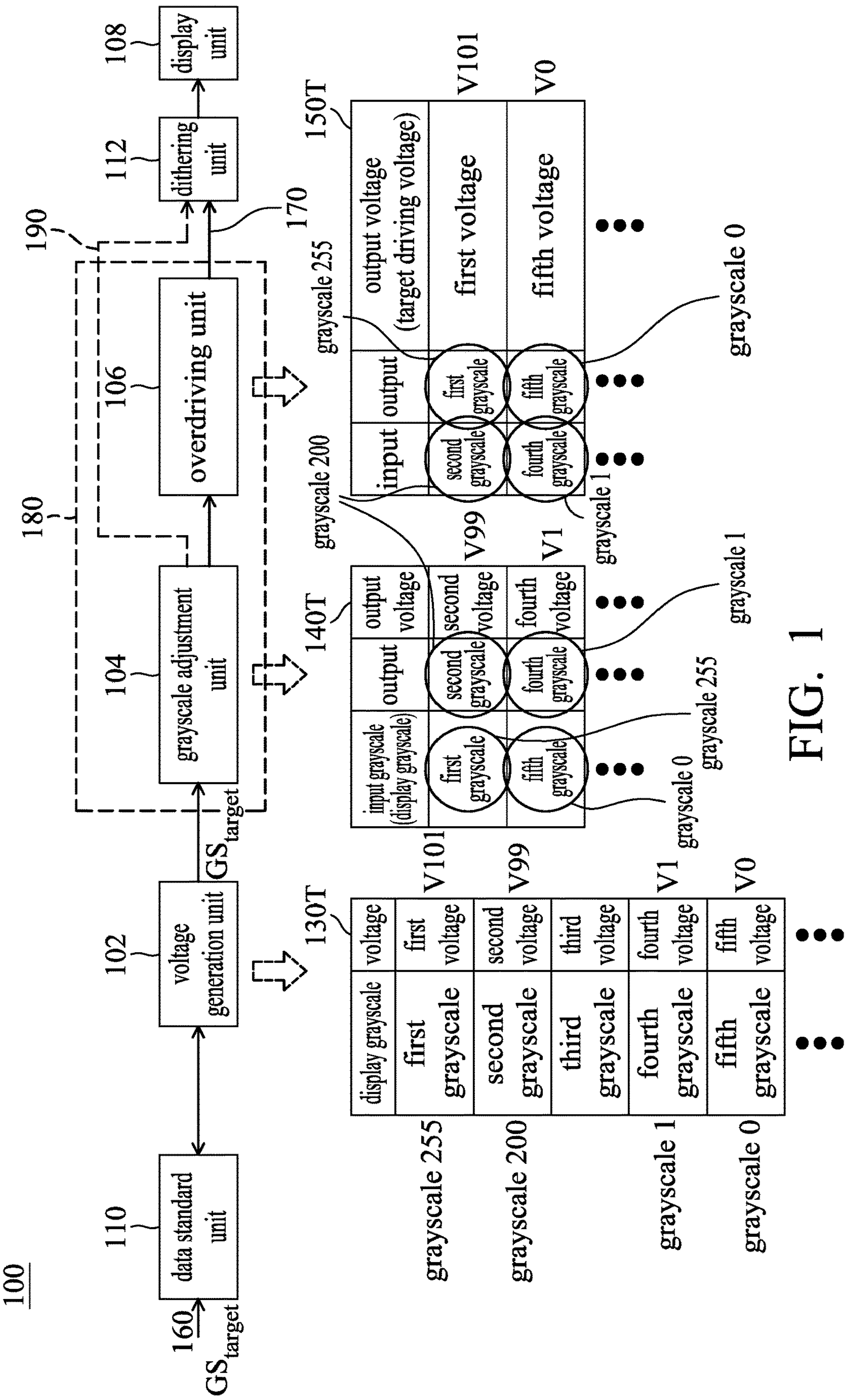
FIG. 1 is a schematic diagram of an electronic device 100 in accordance with some embodiments of the present disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

In the present disclosure, the electronic device 100 may include a display device, a backlight device, an antenna device, a sensing device, or a splicing device, etc., but is not limited thereto. The electronic device may be a bendable or flexible electronic device. The display device may be a non-self-luminous display device or a self-luminous display device. The antenna device may be a liquid-crystal antenna device or a non-liquid-crystal antenna device, and the sensing device may be a sensing device for sensing capacitance, light, heat, or ultrasonic waves, but is not limited thereto. The electronic components may include passive and active components, such as capacitors, resistors, inductors, diodes, transistors, and the like. The diodes may include light-emitting diodes or photodiodes. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The splicing device may be, for example, a splicing display device or a splicing antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

FIG. 1 is a schematic diagram of an electronic device 100 in accordance with some embodiments of the present disclosure. As shown in FIG. 1, the electronic device 100 includes a voltage generation unit 102, a grayscale adjustment unit 104, an overdriving unit 106, a display unit 108, a data standard unit 110, and a dithering unit 112. In some embodiments, the display unit 108 has a relationship curve between the transmittance and the driving voltage, as shown by the graph 210C in FIG. 2. The graph 210C has a predetermined voltage value V100 corresponding to the maximum transmittance T100. The voltage generation unit 102 generates a first voltage according to a first grayscale, and generates a second voltage according to a second grayscale, as shown in a table 130T. The first grayscale may be higher than the second grayscale, the first voltage may be higher than the second voltage and the predetermined voltage value V100. The grayscale adjustment unit 104 may be disposed between the voltage generation unit 102 and the overdriving unit 106. The grayscale adjustment unit 104 receives a first display grayscale value. When the first display grayscale value is equal to the first grayscale, the grayscale adjustment unit 104 may output the second grayscale. The overdriving unit 106 may overdrive the second voltage (V99) corresponding to the second grayscale to obtain a first target driving voltage V101, and provide the first target driving voltage V101 to the display unit 108. In the present disclosure, the numerical values (such as grayscale value, transmittance, voltage, etc.) shown in the tables and figures are only examples for convenience of description, and are not intended to limit the present disclosure.

Specifically, in the voltage generation unit 102, the corresponding relationship between the grayscale and the voltage is as shown in the table 130T. In some embodiments, the first grayscale may be higher than the second grayscale, the first voltage may be higher than the second voltage, and the first voltage may be higher than the predetermined voltage value V100, but the present disclosure is not limited thereto. In some embodiments, as shown in the graph 210C of the display unit 108 in FIG. 2, the maximum transmittance T100 may correspond to the predetermined voltage value V100, the first voltage V99 may correspond to a first transmittance T99, and the second voltage V101 may correspond to a second transmittance T101, and the first transmittance T99 and the second transmittance T101 may be the same, but the present disclosure is not limited thereto. The first transmittance T99 and the second transmittance T101 are lower than the maximum transmittance T100. According to some embodiments, the maximum transmittance T100 may be 100%, the first transmittance T99 and the second transmittance T101 may be between 90% and 99.9%, for example between 95% and 99.5%, between 98% and 99.5%, and 99%. In some embodiments, the voltage generation unit 102 may be, for example, a P-gamma integrated circuit (IC), but the present disclosure is not limited thereto. In some embodiments, the P-gamma IC may provide a gamma voltage to the display unit 108. The gamma voltage may affect the grayscale display and color white balance of the LCD panel. Generally, the grayscale of the display unit 108 is not a linear curve, because the perception of light by the human eye is not a linear curve. In the P-gamma IC, the gamma voltage may be adjusted with a resolution of N bits through the communication interface, so that the above-mentioned gamma voltage curve for grayscale display can be adjusted arbitrarily. N is a positive integer.

Please continue to refer to FIG. 1. In some embodiments, when the grayscale that can be adjusted by the display unit 108 is 0 to 255 (for example, represented by 8 bits), the data standard unit 110 may provide a first grayscale (for example, 255), a second grayscale (for example, 200 to 254), a third grayscale (for example, 127 to 199), a fourth grayscale (for example, 1 to 62), and a fifth grayscale (for example, 0), but the present disclosure is not limited thereto. According to some embodiments, the first grayscale may be the highest grayscale that can be adjusted in the display unit 108, and the fifth grayscale may be the lowest grayscale that can be adjusted in the display unit 108. In some embodiments, the data standard unit 110 may provide or define the first grayscale, the second grayscale, the third grayscale, the fourth grayscale, and the fifth grayscale according to the voltage-to-transmittance curve of the display unit 108 and the gamma curve 2.2. In detail, the voltages corresponding to the first grayscale, the second grayscale, the third grayscale, the fourth grayscale, and the fifth grayscale are defined by the voltage generation unit 102. In other words, the data standard unit 110 may provide a specific grayscale to the voltage generation unit 102, so that the voltage generation unit 102 may find a voltage corresponding to a specific grayscale with respect to the voltage-to-transmittance curve of the display unit 108 and the gamma curve 2.2, and generate the table 130T. In some embodiments, the data standard unit 110 can be, for example, a data integrated circuit (data IC), but the present disclosure is not limited thereto.

For example, refer to the table 130T, the voltage generation unit 102 generates the first voltage (V101) according to the first grayscale, generates the second voltage (V99) according to the second grayscale, generates the third voltage according to the third grayscale, generates the fourth voltage according to the fourth grayscale, and generates the fifth voltage according to the fifth grayscale, but the present disclosure is not limited thereto. The first grayscale is higher than the second grayscale, the fourth grayscale is higher than the fifth grayscale but lower than the second grayscale, and the fourth voltage is higher than the fifth voltage but lower than the second voltage. According to some embodiments, the grayscale adjustment unit 104 receives a second display grayscale. When the second display grayscale is equal to the fifth grayscale, the grayscale adjustment unit 104 outputs the fourth grayscale. According to some embodiments, the first grayscale can be a value between 250 and 255, the second grayscale can be a value between 200 and 254, the fourth grayscale can be a value between 1 and 10, and the fifth grayscale can be a value between 0 and 5. According to some embodiments, the first grayscale may be 255, the second grayscale may a value between 200 and 254, the fourth grayscale may be 1, and the fifth grayscale may be 0. According to some embodiments, the first grayscale may be a value between 250 and 255, the second grayscale may be a value between 180 and 250, the fourth grayscale may be a value between 1 and 10, and the fifth grayscale may be a value between 0 and 5. According to some embodiments, the first grayscale may be 255, the second grayscale may be 200, the fourth grayscale may be 1, and the fifth grayscale may be 0. According to some embodiments, the difference between the fourth voltage and the fifth voltage may be between 0.1V and 1V, for example between 0.2V and 0.8V, and for example between 0.2V and 0.5V. According to some embodiments, taking the difference between the fourth voltage and the fifth voltage as 0.3V as an example, the fourth voltage may be 0.5V, and the fifth voltage may be 0.2V.

According to some embodiments, the voltage generation unit 102 includes a plurality of voltage dividing resistors. The voltage generation unit 102 may correspondingly generate the first voltage (V101), the second voltage (V99), the third voltage, the fourth voltage, and the fifth voltage through the configuration of the resistance value of the internal voltage dividing resistors. In some embodiments, the data standard unit 110 may read the information in the table 130T of the voltage generation unit 102. In some embodiments, the data standard unit 110 may divide the first voltage and the second voltage to obtain voltage values corresponding to other grayscales between the first grayscale and the second grayscale. The data standard unit 110 may divide the second voltage and the third voltage to obtain voltage values corresponding to other grayscales between the second grayscale and the third grayscale. Similarly, the data standard unit 110 may divide the fifth voltage and the fourth voltage to obtain voltage values corresponding to other grayscales between the fourth grayscale and the fifth grayscale.

In some embodiments, the grayscale adjustment unit 104 may receive a display grayscale value $GS_{target}$ included in input data 160. In some embodiments, the input data 160 are image data with grayscale value information, but the present disclosure is not limited thereto. In some embodiments, the input data 160 include the display grayscale value $GS_{target}$ corresponding to the respective pixels included in the display unit 108. When the display grayscale value $GS_{target}$ is equal to the first grayscale (for example, the highest grayscale 255) in the table 140T, the grayscale adjustment unit 104 outputs the second grayscale (for example, the grayscales 200 to 254) to the overdriving unit 106 according to the table 140T. Afterwards, the overdriving unit 106 overdrives the second voltage (V99) corresponding to the second grayscale according to the table 150T to obtain a first target driving voltage (V101). The overdriving unit 106 outputs output data 170 including the first target driving voltage (V101) to the dithering unit 112 for finally providing to the display unit 108.

In some embodiments, when a single pixel in the display unit 108 changes from the low grayscale of the current frame to the high grayscale of the next frame, for example, during the change process of the single pixel included in the display unit 108 from dark to bright, the first target driving voltage (V101) drives a single pixel included in the display unit 108, so that the brightness of the single pixel varies according to the first target driving voltage (V101). In detail, the grayscale adjustment unit 104 receives the display grayscale value $GS_{target}$ corresponding to respective pixels included in the display unit 108. When the display grayscale value $GS_{target}$ is equal to the first grayscale (for example, the highest grayscale 255), the grayscale adjustment unit 104 outputs a second grayscale (for example, grayscale 200). The overdriving unit 106 overdrives the second voltage (V99) corresponding to the second grayscale to obtain the first target driving voltage (V101). In the present disclosure, the numerical values of respective grayscale (such as the first grayscale, the second grayscale, etc.) are just examples for convenience of description, and are not intended to limit the present disclosure. In some embodiments, the first target driving voltage (V101) and the first voltage (V101) corresponding to the first grayscale (for example, the highest grayscale 255) may be the same. In some embodiments, the grayscale adjustment unit 104 and the overdriving unit 106 are disposed in a panel control board (TCON) 180, but the disclosure is not limited thereto. In some embodiments, the first grayscale may be the highest grayscale that can be adjusted in the display unit 108. Specifically, when the grayscale that can be adjusted by the display unit 108 is 0 to 255 (for example, represented by 8 bits), the first grayscale may be a value between 250 and 255, and the second grayscale may be a value between 180 and 250, but the present disclosure is not limited thereto. In some embodiments, the grayscale adjustment unit 104 may be, for example, a white-tracking IC, but the present disclosure is not limited thereto.

According to some embodiments, the grayscale adjustment unit 104 may be set to perform the following action. When the grayscale adjustment unit 104 receives the display grayscale value $GS_{target}$, the grayscale adjustment unit 104 may output corresponding grayscale values, thus generating the table 140T. As shown in table 140T, when the display grayscale value $GS_{target}$ received by the grayscale adjustment unit 104 is equal to the first grayscale (i.e., the highest grayscale 255), the grayscale adjustment unit 104 may output the second grayscale (e.g., the grayscales 200 to 254) to the overdriving unit 106. In some embodiments, the grayscale adjustment unit 104 may also output the second voltage (V99) corresponding to the second grayscale (e.g., the grayscale 200 to 254) to the overdriving unit 106. Similarly, when the display grayscale value $GS_{target}$ received by the grayscale adjustment unit 104 is equal to the fifth grayscale (i.e., the lowest grayscale), the grayscale adjustment unit 104 may output the fourth grayscale to the overdriving unit 106. In some embodiments, the grayscale adjustment unit 104 may also output a fourth voltage corresponding to the fourth grayscale to the overdriving unit 106.

According to some embodiments, the grayscale adjustment unit 104 receives the first display grayscale value. When the first display grayscale value is equal to the first grayscale, the grayscale adjustment unit 104 outputs the second grayscale with a lower value, and the second grayscale is lower than the first grayscale. For example, the difference between the second grayscale and the first grayscale may be between 1 and 80, such as between 5 and 70, between 10 and 60, between 30 and 60, and 55. According to some embodiments, Taking the difference between the second grayscale and the first grayscale as 55 as an example, when the received first display grayscale value is 255, the grayscale adjustment unit 104 may output 200. When the received first display grayscale value is 254, the grayscale adjustment unit 104 may output 199. When the received first display grayscale value is 253, the grayscale adjustment unit 104 may output 198. According to some embodiments, the first grayscale may be between 220 and 255, such as between 235 and 255, between 245 and 255, and between 250 and 255.

When the overdriving unit 106 is electrically connected between the voltage generation unit 102 and the grayscale adjustment unit 104, and the display grayscale received by the overdriving unit 106 is equal to the highest grayscale (for example, 255), the overdriving unit 106 cannot overdrive the highest gray scale with another voltage higher than a voltage corresponding to the highest grayscale, and thus cannot improve the response time of the display unit 108 during grayscale adjustment.

According to some embodiments, as in the electronic device 100 in FIG. 1, the grayscale adjustment unit 104 is electrically connected between the voltage generation unit 102 and the overdriving unit 106. When a single pixel in the display unit 108 changes from the low grayscale of the current frame to the high grayscale of the next frame, for example, when the single pixel included in the display unit 108 changes from dark to bright, and when the display grayscale of the next frame received by the grayscale adjustment unit 104 is equal to the highest grayscale (for example, 255), the grayscale adjustment unit 104 may define the highest grayscale as a second grayscale with a lower value (for example, 200), that is, it receives the first grayscale but outputs the second grayscale to the overdriving unit 106. The grayscale adjustment unit 104 cooperates with the voltage generation unit 102 to generate a first voltage according to the first grayscale, and to generate a second voltage according to the second grayscale, and the first voltage may be higher than the second voltage. Therefore, the overdriving unit 106 may overdrive the second voltage corresponding to the second grayscale (for example, 200), which can reduce the response time of the display unit 108 during grayscale adjustment. For example, when the picture displayed by the display unit 108 is a dynamic picture, that is, the grayscale changes between adjacent frames (i.e., successive images), and the display grayscale value $GS_{target}$ received by the grayscale adjustment unit 104 is equal to the first grayscale (i.e., the highest grayscale 255) and the second voltage (V99) corresponding to the second grayscale (e.g., grayscale 200) is output, the overdriving unit 106 may overdrive the second voltage (V99) corresponding to the second grayscale (for example, grayscale 200) according to the table 150T, and output the first target driving voltage (V101) equal to the first voltage (voltage V101) to the display unit 108. In some embodiments, the first target driving voltage (V101) may be included in output data 170, but the present disclosure is not limited thereto. In some embodiments, the overdriving unit 106 may be, for example, an overdriving integrated circuit, but the present disclosure is not limited thereto. In some embodiments, the display unit 108 may be, for example, a display panel, but the disclosure is not limited thereto.

In some embodiments, when images displayed by the display unit 108 are static images, that is, the grayscale does not change between adjacent frames (i.e., successive images), the display grayscale value $GS_{target}$ received by the grayscale adjustment unit 104 is equal to the first grayscale (i.e., the highest grayscale 255), and the grayscale adjustment unit 104 outputs the second voltage (V99) corresponding to the second grayscale (e.g., grayscale 200)(refer to the first column of the table 140T), the overdriving unit 106 does not overdrive the second voltage (V99) corresponding to the second grayscale (e.g., grayscale 200) (e.g., a data path 190 in FIG. 1). In other words, the grayscale adjustment unit 104 may directly output the second voltage (V99) corresponding to the second grayscale (for example, grayscale 200) to the display unit 108 through the data path 190, so that the overdriving unit 106 does not perform overdrive processing.

In some embodiments, the overdrive unit 106 generates the table 150T according to the table 130T. In detail, when a single pixel in the display unit 108 changes from the low grayscale of the current frame to the high grayscale of the next frame, that is, when the single pixel included in the display unit 108 changes from dark to bright, the overdriving unit 106 may perform overdrive, and use a driving voltage corresponding to a higher grayscale that is at least one grayscale higher than the input grayscale to output to the display unit 108, which can reduce the response time of the display unit 108 during grayscale adjustment. For example, as shown in the table 150T in FIG. 1, when the grayscale input to the overdriving unit 106 is the second grayscale (for example, 200), the overdriving unit 106 overdrives the second grayscale, and outputs the first voltage (V101) corresponding to the higher first grayscale (for example, 255), which is higher than the second grayscale by at least one grayscale, to the display unit 108. That is, the first target driving voltage is equal to the first voltage (V101).

When a single pixel in the display unit 108 changes from a high grayscale of the current frame to a low grayscale of the next frame, for example, when a single pixel included in the display unit 108 changes from bright to dark, the overdriving unit 106 may perform overdrive, and use a driving voltage corresponding to a lower grayscale that is at least one grayscale lower than the input grayscale to output to the display unit 108, which can reduce the response time of the display unit 108 during grayscale adjustment. For example, as shown in the table 150T in FIG. 1, when the grayscale input to the overdriving unit 106 is the fourth grayscale (for example, the grayscale 1), the overdriving unit 106 overdrives the fourth grayscale, and outputs the a fifth voltage (V0) corresponding to a lower fifth grayscale (e.g., the grayscale 0), which is at least one grayscale lower than the fourth grayscale (e.g., the grayscale 1), to the display unit 108. That is, the second target driving voltage is equal to the fifth voltage (V0). That is, the overdriving unit 106 overdrives the fourth voltage (V1) corresponding to the fourth grayscale (for example, the grayscale 1) to obtain the second target driving voltage, and provides the second target driving voltage to the display unit 108.

After operating according to the above rules, the over-driving unit 106 may thus generate the table 150T. In some embodiments, when a single pixel in the display unit 108 changes from the high grayscale of the current frame to the low grayscale of the next frame, that is, during the change process of the single pixel included in the display unit 108 from bright to dark, the second target driving voltage (V0) drives a single pixel included in the display unit 108, so that the brightness of the single pixel varies according to the second target driving voltage (V0).

In some embodiments, when images displayed by the display unit 108 are static images, that is, the grayscale does not change between adjacent frames, the display grayscale value received by the grayscale adjustment unit 104 is equal to the fifth grayscale (i.e., the lowest grayscale), and the grayscale adjustment unit 104 outputs the fourth voltage, the overdriving unit 106 will not overdrive the fourth voltage corresponding to the fourth grayscale. In other words, the grayscale adjustment unit 104 may directly output the fourth voltage (V1) corresponding to the fourth grayscale through the data path 190, so that the overdriving unit 106 does not overdrive according to the table 150T. In contrast, when images displayed by the display unit 108 are dynamic images, that is, the grayscale changes between adjacent frames, the display grayscale value received by the grayscale adjustment unit 104 is equal to the fifth grayscale (i.e., the lowest grayscale), and the grayscale adjustment unit 104 outputs the fourth voltage, the overdriving unit 106 may overdrive the fourth voltage corresponding to the fourth grayscale according to the table 150T, and output the second target driving voltage equal to the fifth voltage. That is, the second target driving voltage and the fifth voltage (V0) corresponding to the fifth grayscale (for example, the gray-scale 0) may be the same. In some embodiments, the second target driving voltage may also be included in the output data 170, but the present disclosure is not limited thereto. In some embodiments, the dithering unit 112 may perform a dithering operation on the output data 170 output by the overdriving unit 106. Since the dithering operation is a prior art, it is not the focus of this disclosure, so the present disclosure will not describe it.

Figure 2:
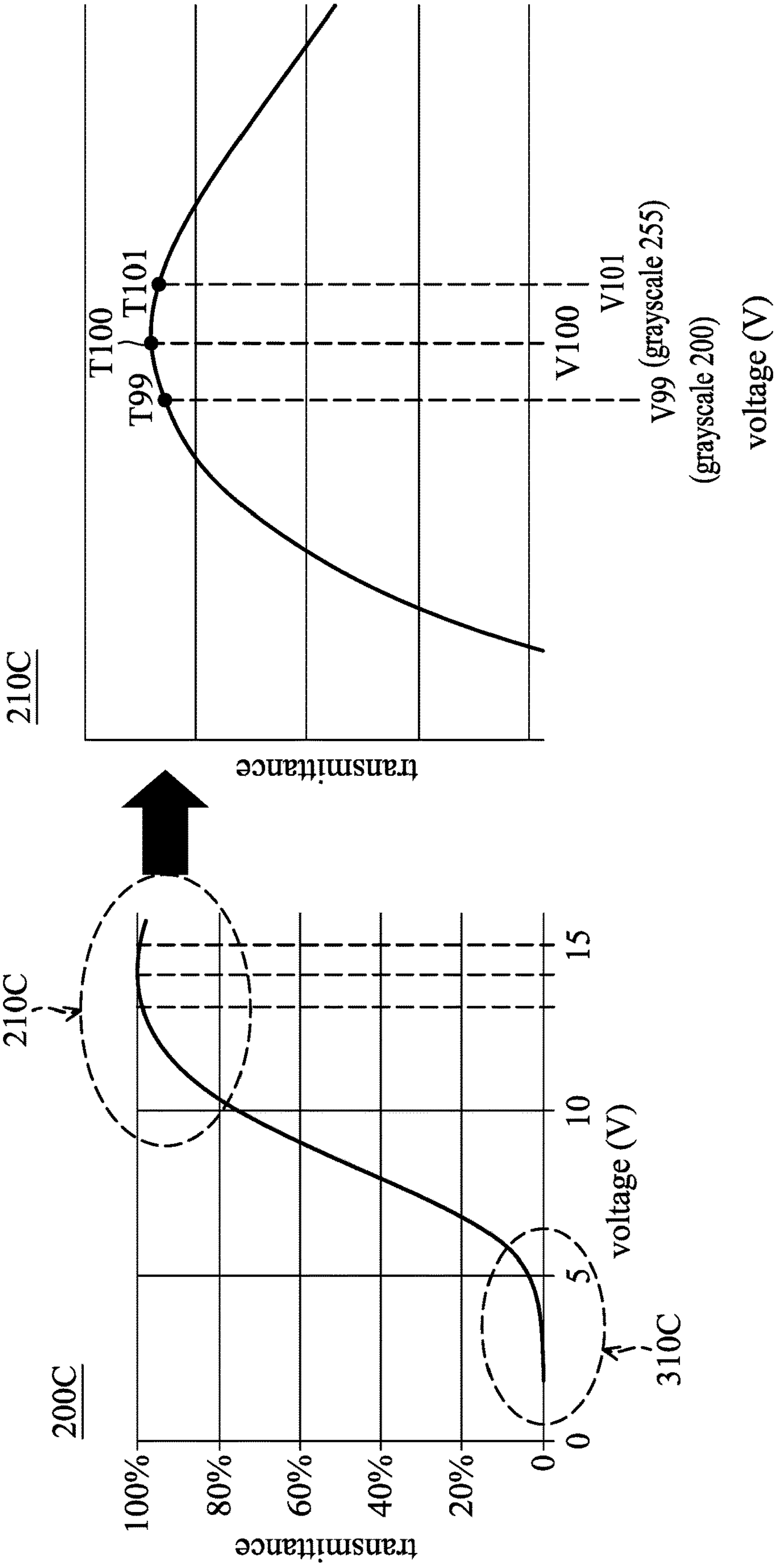
FIG. 2 is a schematic diagram of a voltage-to-transmittance curve of a display unit 108 of the electronic device 100 in FIG. 1 in accordance with some embodiments of the present disclosure.

FIG. 2 is a schematic diagram of a voltage-to-transmit-tance curve of a display unit 108 of the electronic device 100 in FIG. 1 in accordance with some embodiments of the present disclosure. As shown in FIG. 2, FIG. 2 includes a graph 200C and the graph 210C. The graph 210C is a portion of the graph 200C. In some embodiments, the graph 200C indicates the physical characteristics of the display unit 108, that is, the rotation of the liquid-crystal in the display unit 108 is driven by different voltages to form changes in different transmittances. Referring to the graph 200C, in general, as the driving voltage increases, the transmittance of the display unit 108 also increases. However, in graph 210C, point T100 is the inversion point of transmittance. In some embodiments, the physical meaning of point T100 is the transmittance of 100%. In other words, when the driving voltage is the voltage V100 (i.e., a predetermined voltage value), the transmittance of the display unit 108 also reaches 100%. When the driving voltage is higher than the voltage V100, as the driving voltage increases, the transmittance of the display unit 108 may decrease instead. For example, at point T101, when the driving voltage is voltage V101 (i.e., the first voltage in FIG. 1), the transmittance of the display unit 108 may be lower than the transmittance corresponding to point T100.

Please refer to the graph 210C in FIG. 2. In some embodiments, the physical meaning of point T99 is the transmittance of 99%. In other words, when the driving voltage is the voltage V99 (i.e., the second voltage in FIG. 1), the transmittance of the display unit 108 also reaches 99%. In some embodiments of FIG. 2, the transmittance corresponding to point T99 is equal to the transmittance of point T101. Please refer to FIG. 1 and FIG. 2 at the same time. The voltage generation unit 102 generates the voltage V101 according to the first grayscale (for example, 255, that is the highest grayscale), and generates the voltage V99 according to the second grayscale (for example, 200). In some embodiments, the voltage generation unit 102 in FIG. 1 fills the table 130T in FIG. 1 with the voltage V101 corresponding to the grayscale 255 and the voltage V99 corresponding to the grayscale 200. Please refer to the graph 210C. Since the transmittance corresponding to point T101 is equal to the transmittance of point T99, when the display unit 108 displays the dynamic images, for example, when a single pixel in the display unit 108 changes from the low grayscale of the current frame to the high grayscale of the next frame, the overdriving unit 106 performs overdrive, and the first target drive voltage provided to the display unit 108 is V101, and the corresponding transmittance reaches 99%. In other words, when the overdriving unit 106 performs overdrive, the brightness of the display unit 108 does not change significantly, so that the user is not easy to perceive the brightness change, thereby improving user experience. According to some embodiments, the overdriving unit 106 performs overdrive to increase the second voltage V99 to the first voltage V101, and the transmittance T101 correspond-ing to the first voltage V101 can reach 99%, which is not much different from the maximum transmittance of 100%. Therefore, the overdrive will not substantially affect the transmittance (brightness) of the display unit 108. That is, in some embodiments, overdriving can make the response time faster without substantially affecting the brightness of the display unit 108. Please refer to the graph 210C again. When the display unit 108 displays the static images, the display unit 108 directly receives the voltage V99 from the grayscale adjustment unit 104 (through the data path 190), so that the transmittance of the display unit 108 can also maintain 99%.

In short, according to the setting of the table 130T of the voltage generation unit 102, the table 140T of the grayscale adjustment unit 104, and the table 150T of the overdriving unit 106, the display unit 108 of the electronic device 100 of the present disclosure can achieve the technical effect of transmittance 99% in static images and dynamic images at the same time. In addition, since the display grayscale value is equal to the first grayscale (for example, 255, that is, the highest grayscale), the overdriving unit 106 may still perform overdrive, the electronic device 100 of the present disclosure can effectively reduce the response time during grayscale adjustment. In some embodiments, The voltage V99 may be, for example, 14.3V, and the voltage V101 may be, for example, 15V, but the disclosure is not limited thereto.

The grayscale adjustment unit 104 receives the display grayscale value. When the display grayscale value is equal to the first grayscale with a higher value, the grayscale adjustment unit 104 outputs the second grayscale with a lower value. The overdriving unit 106 may overdrive the second voltage corresponding to the second grayscale with the lower value to obtain a target driving voltage, and provide the target driving voltage to the display unit 108. According to some embodiments, in the case that the display unit 108 is a liquid-crystal display device, even if the display grayscale value is relatively high, the display grayscale value can be overdriven, thereby reducing the response time of the display unit 108 during grayscale adjustment.

Figure 3:
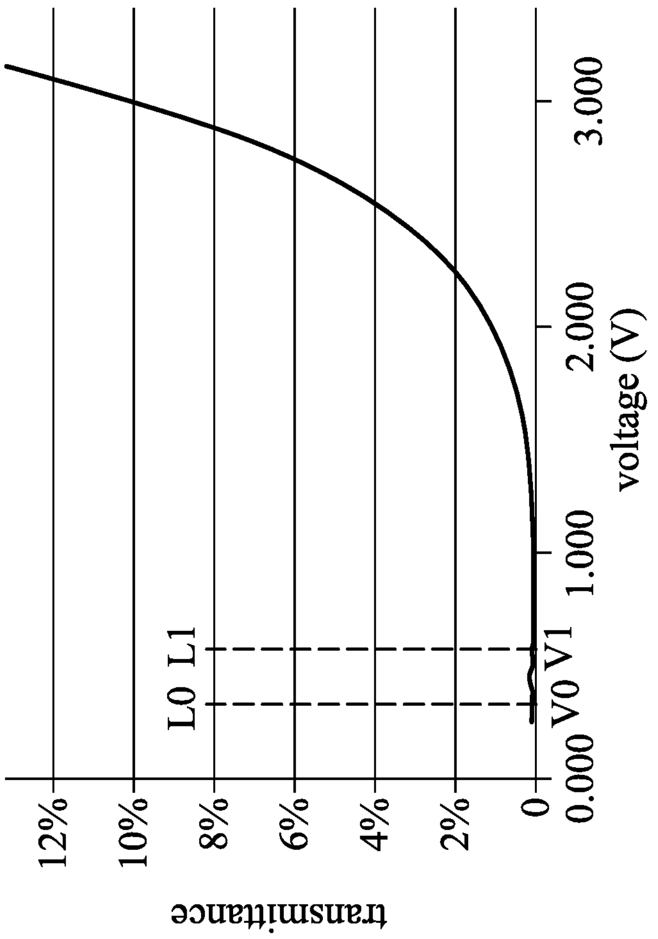
FIG. 3 is a schematic diagram of a voltage-to-transmittance curve of the display unit 108 of the electronic device 100 in FIG. 1 in accordance with some embodiments of the present disclosure.

FIG. 3 is a schematic diagram of a voltage-to-transmittance curve of the display unit 108 of the electronic device 100 in FIG. 1 in accordance with some embodiments of the present disclosure. As shown in FIG. 3, FIG. 3 includes a graph 310C. In some embodiments, the graph 310C indicates the physical characteristics of the display unit 108, that is, the rotation of the liquid-crystal in the display unit 108 is driven by different voltages to form changes in different transmittances. In some embodiments, the physical meaning of point L0 is the transmittance of 0%. In other words, when the driving voltage is the voltage V0 (i.e., the fifth voltage in FIG. 1), the transmittance of the display unit 108 may also drop to 0%.

Please refer to FIG. 1, FIG. 2, and FIG. 3 at the same time. The voltage generation unit 102 generates the voltage V0 according to the fifth grayscale (for example, 0, that is the lowest grayscale), and generates the voltage V1 according to the fourth grayscale (for example, 1-62). When the images displayed by the display unit 108 are dynamic images, that is, the grayscale changes between adjacent frames, the display grayscale value received by the grayscale adjustment unit 104 is equal to the fifth grayscale (for example, 0, that is the lowest grayscale), and the grayscale adjustment unit 104 outputs the voltage V1 corresponding to the fourth grayscale, the overdriving unit 106 overdrives the voltage V1 corresponding to the fourth grayscale, and outputs a second target driving voltage equal to the voltage V0 to the display unit 108. Please refer to the graph 310C. Since the brightness change corresponding to point L1 and point L0 is not obvious, it is difficult for the user to perceive the brightness change, thereby improving the user experience.

In some embodiments, when the images displayed by the display unit 108 are static pictures, that is, the grayscale does not change between adjacent frames, the display grayscale value received by the grayscale adjustment unit 104 is equal to the fifth grayscale (for example, 0, that is the lowest grayscale), and the grayscale adjustment unit 104 outputs the voltage V1 corresponding to the fourth grayscale, the overdriving unit 106 may not overdrive the voltage V1 corresponding to the fourth grayscale. Therefore, the overdriving unit 106 directly outputs the voltage V1 corresponding to the fourth grayscale to the display unit 108. Since the display grayscale value is equal to the fifth grayscale (for example, 0, the lowest grayscale), the overdriving unit 106 may still overdrive, the electronic device 100 of the present disclosure can effectively reduce the response time during grayscale adjustment. In some embodiments, the voltage V0 may be, for example, 0.2V, and the voltage V1 may be, for example, 0.5V, but the present disclosure is not limited thereto.

Figure 4:
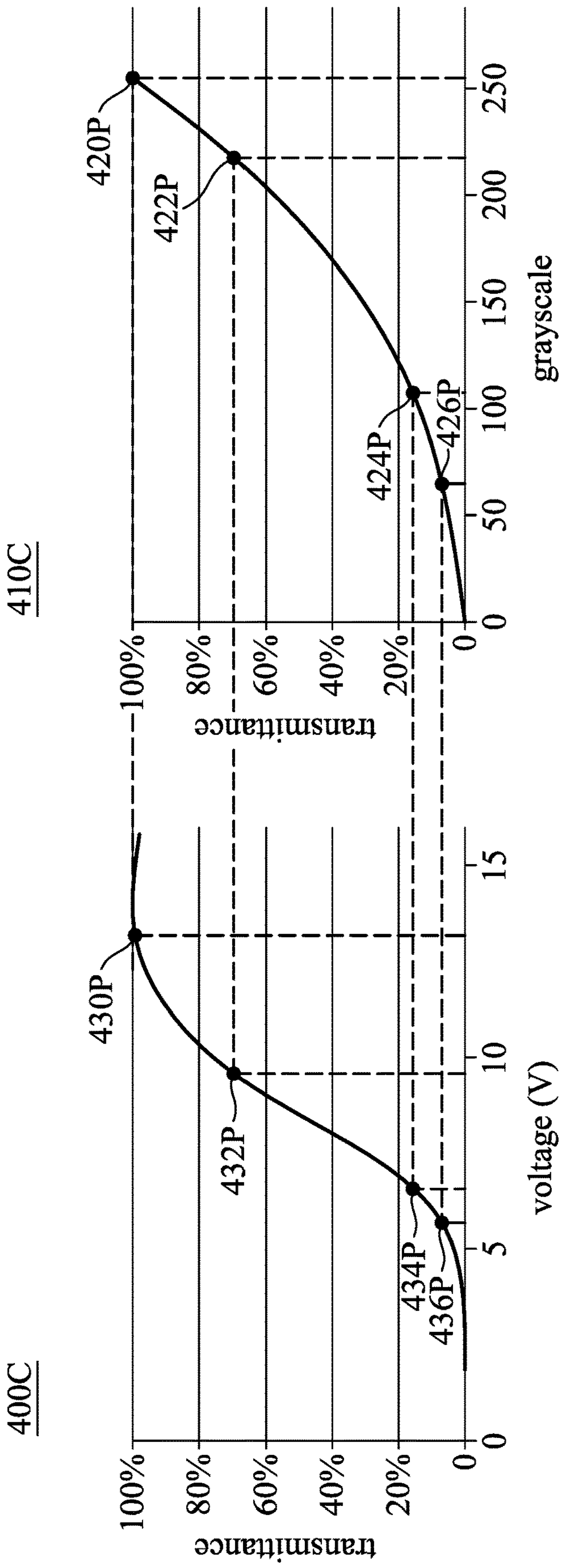
FIG. 4 is a schematic diagram of a data standard unit 110 of the electronic device 100 in FIG. 1 defining multiple grayscale endpoints according to a graph 400C and a graph 410C in accordance with some embodiments of the present disclosure.

FIG. 4 is a schematic diagram of a data standard unit 110 of the electronic device 100 in FIG. 1 defining multiple grayscale endpoints according to a graph 400C and a graph 410C in accordance with some embodiments of the present disclosure. As shown in FIG. 4, the graph 400C is a voltage-to-transmittance curve of the display unit 108 of the electronic device 100. The graph 410C is a standard gamma curve 2.2, representing the smoothness of the display unit 108 transitioning from black (e.g., the lowest grayscale) to white (e.g., the highest grayscale). In short, the data standard unit 110 is a standard for matching the voltage-to-transmittance curve of the display unit 108 to the gamma curve 2.2. in some embodiments of FIG. 4, the horizontal axis of the graph 400C and the graph 410C is the voltage, and the vertical axis is the transmittance. In the graph 410, the data standard unit 110 first provides multiple grayscale endpoints according to different transmittances, such as a grayscale endpoint 420P (for example, grayscale 255), a grayscale endpoint 422P (for example, grayscale 220), a grayscale endpoint 424P (for example, grayscale 127), and a grayscale endpoint 426P (for example, grayscale 63). However, the present disclosure does not limit the total number of grayscale endpoints and the grayscale values corresponding to the grayscale endpoints.

Next, the data standard unit 110 finds the driving voltage corresponding to the grayscale endpoint 420P, the grayscale endpoint 422P, the gray-scale endpoint 424P, and the grayscale endpoint 426P in the graph 400C. The data standard unit 110 horizontally extends a dotted line from the grayscale endpoint 420P to intersect the voltage-to-transmittance curve of the display unit 108 in the graph 400C to obtain a point 430P. The driving voltage corresponding to point 430P may be, for example, 14.3V. Similarly, the data standard unit 110 horizontally extends a dotted line from the grayscale endpoint 422P to intersect the voltage-to-transmittance curve of the display unit 108 in the graph 400C to obtain a point 432P. The driving voltage corresponding to point 432P may be, for example, 8.856V. The data standard unit 110 extends a dotted line horizontally from the grayscale endpoint 424P to intersect the voltage-to-transmittance curve of the display unit 108 in the graph 400C to obtain a point 434P. The driving voltage corresponding to point 434P may be, for example, 6.48V. The data standard unit 110 extends a dotted line horizontally from the grayscale endpoint 426P to intersect the voltage-to-transmittance curve of the display unit 108 in the graph 400C to obtain a point 436P. The driving voltage corresponding to the point 436P may be, for example, 5.48V. Therefore, the data standard unit 110 may obtain the initial driving voltage corresponding to the grayscale 255 as 14.3V, the initial driving voltage corresponding to the grayscale 200 as 8.856V, the initial driving voltage corresponding to the grayscale 127 as 6.45V, and the initial voltage corresponding to the grayscale 63 is 5.48V.

Next, the data standard unit 110 divides the initial driving voltage 14.3V corresponding to the grayscale 255 and the initial driving voltage 8.856V corresponding to the grayscale 200 to obtain voltage values corresponding to other grayscales between the grayscale 255 and the grayscale 200. Similarly, the data standard unit 110 divides the initial driving voltage 8.856V corresponding to the grayscale 200 and the initial driving voltage 6.45V corresponding to the grayscale 127 to obtain voltage values corresponding to other grayscales between the grayscale 200 and the grayscale 127. The data standard unit 110 divides the initial driving voltage 6.45V corresponding to the grayscale 127 and the initial driving voltage 5.45V corresponding to the grayscale 63 to obtain voltage values corresponding to other grayscales between the grayscale 127 and the grayscale 63. In other words, the data standard unit 110 may initially provide different grayscales and initial driving voltages corresponding to different grayscales. In some embodiments, the voltage values corresponding to other grayscales between the grayscale 255 and the grayscale 200, the voltage values corresponding to other grayscales between the grayscale 200 and the grayscale 127, and the voltage values corresponding to other grayscales between the grayscale 127 and the grayscale 63 also meet the standard of gamma curve 2.2.

However, according to some embodiments of the present disclosure, the initial driving voltage provided by the data standard unit 110 may not be directly applied. Instead, the voltage generation unit 102 sets the initial driving voltage of 14.3V corresponding to the original grayscale 255 as the driving voltage corresponding to the new grayscale 200 (i.e., the second voltage in FIG. 1), which will be higher than the new grayscale 200. The voltage generation unit 102 sets another driving voltage 15V corresponding to the driving voltage 14.3V as the driving voltage corresponding to the new grayscale 255 (i.e., the first voltage in FIG. 1). When the grayscale adjustment unit 104 receives the display grayscale 255, the grayscale adjustment unit 104 may output the new grayscale 200 to the overdriving unit 106. Next, the overdriving unit 106 may overdrive the driving voltage 14.3V corresponding to the new grayscale 200, so that the first target driving voltage output by the overdriving unit 106 is equal to the driving voltage 15V. Since the overdriving unit 106 may overdrive the highest grayscale with another driving voltage 15V higher than (corresponding to the highest grayscale) driving voltage 14.3V, the response time of the display unit 108 during grayscale adjustment can be reduced.

Figure 5:
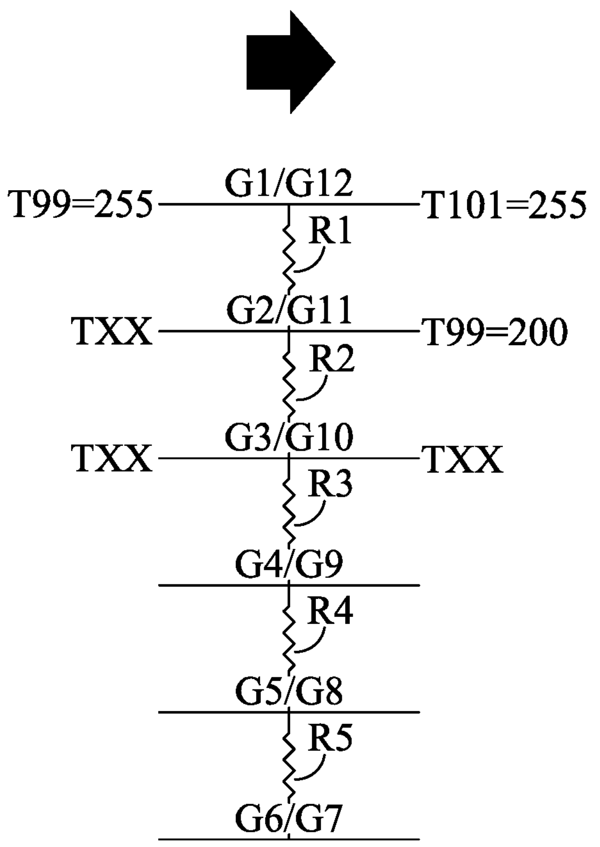
FIG. 5 is a schematic diagram of a voltage generation unit 102 of the electronic device 100 in FIG. 1 generating voltages corresponding to multiple grayscale endpoints according to a table 500T and a table 130T in FIG. 1 in accordance with some embodiments of the present disclosure.

FIG. 5 is a schematic diagram of a voltage generation unit 102 of the electronic device 100 in FIG. 1 generating voltages corresponding to multiple grayscale endpoints according to a table 500T and a table 130T in FIG. 1 in accordance with some embodiments of the present disclosure. In some embodiments of FIG. 5, table 500 is a matching table initially provided by the voltage generation unit 102 for different grayscales and initial driving voltages corresponding to different grayscales. For example, the grayscale 255 corresponds to the initial driving voltage of 14.3V (corresponding to point T99 in FIG. 2). The grayscale 200 corresponds to the initial driving voltage of 8.856V. The grayscale 127 corresponds to the initial driving voltage of 6.45V. The grayscale 63 corresponds to the initial driving voltage of 5.48V. The grayscale 1 corresponds to the initial driving voltage of 2.98V. The grayscale 0 corresponds to the initial driving voltage of 0.5V. In table 130T, the voltage generation unit 102 sets the initial driving voltage of 14.3V corresponding to the original grayscale 255 as the driving voltage corresponding to the new grayscale 200 (that is, converted from table 500T to table 130T) (i.e., the second voltage in FIG. 1, corresponding to point T99 in FIG. 2). The voltage generation unit 102 sets another driving voltage of 15V higher than the driving voltage of 14.3V as the driving voltage corresponding to the new grayscale 255 (i.e., the first voltage in FIG. 1, corresponding to point T101 in FIG. 2). Therefore, the overdriving unit 106 may overdrive the driving voltage of 14.3V corresponding to the new grayscale 200, and output the first target driving voltage equal to the driving voltage of 15V.

In detail, since the voltage generating unit 102 includes multiple voltage dividing resistors (such as voltage dividing resistors R1, R2, R3, R4, R5). The voltage dividing resistors is partially connected in series with each other and/or partially connected in parallel with each other. The voltage generation unit 102 may measure the divided voltage on different nodes. For example, the voltage generation unit 102 may measure different divided voltages at node G1, node G2, node G3, node G4, node G5, node G6, node G7, node G8, node G9, node G10, node G11, and node 12. Next, the voltage generation unit 102 may subtract the divided voltages on different corresponding nodes to obtain driving voltages corresponding to different grayscales. For example, the voltage generation unit 102 subtracts the divided voltage of node G12 from the divided voltage of node G1 to obtain the driving voltage of 15V corresponding to the grayscale 255. The voltage generation unit 102 subtracts the divided voltage of node G11 from the divided voltage of node G2 to obtain the driving voltage of 14.3V corresponding to the grayscale 200. The voltage generation unit 102 subtracts the divided voltage of node G10 from the divided voltage of node G3 to obtain the driving voltage of 6.45V corresponding to the grayscale 127. The voltage generation unit 102 subtracts the divided voltage of node G9 from the divided voltage of node G4 to obtain the driving voltage of 5.48V corresponding to the grayscale 63. The voltage generation unit 102 subtracts the divided voltage of node G8 from the divided voltage of node G5 to obtain the driving voltage of 2.98V corresponding to the grayscale 1. The voltage generation unit 102 subtracts the divided voltage of node G7 from the divided voltage of node G6 to obtain the driving voltage of 0.5V corresponding to the grayscale 0.

Similarly, in some embodiments, refer to table 130T, the voltage generation unit 102 may also set the initial driving voltage of 0.5V corresponding to the original grayscale 0 as the driving voltage corresponding to the new grayscale 1 (that is, the fourth voltage in FIG. 1, corresponding to point L1 in FIG. 3). The voltage generation unit 102 may set another driving voltage of 0.2V lower than the driving voltage of 0.5V as the driving voltage corresponding to the new grayscale 0 (i.e., the fifth voltage in FIG. 1, corresponding to point L0 in FIG. 3). Therefore, the overdriving unit 106 may overdrive the driving voltage of 0.5V corresponding to the new grayscale 1, so that the overdriving unit 106 outputs the second target driving voltage equal to the driving voltage of 0.2V.

According to some embodiments of the present disclosure, in the electronic device 100, the grayscale adjustment unit 104 receives a display grayscale value, and outputs a second grayscale with a lower value when the display grayscale value is equal to the first grayscale with a higher value. The overdriving unit 106 overdrives the second voltage corresponding to the second grayscale with a lower value to obtain a target driving voltage, and provides the target driving voltage to the display unit 108. According to some embodiments, in the case where the display unit 108 is a liquid-crystal display element, even if the display grayscale value is relatively high, overdrive can be performed, thereby reducing the response time of the display unit 108 during grayscale adjustment, and improving user experience. According to some embodiments, the transmittance corresponding to the first grayscale and the transmittance corresponding to the second grayscale can be approximately the same, so that the overdrive will not have a substantial impact on the brightness of the display unit, and the brightness change is not obvious, which can improve user experience.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:

a display unit; wherein the display unit has a relationship curve between a transmittance and a driving voltage, and the relationship curve has a predetermined voltage value corresponding to a maximum transmittance;

a voltage generation unit, configured to generate a first voltage according to a first grayscale, and generate a second voltage according to a second grayscale; wherein the first grayscale is higher than the second grayscale, and the first voltage is higher than the second voltage and the predetermined voltage value;

a grayscale adjustment unit, configured to receive a first display grayscale value, and output the second grayscale when the first display grayscale value is equal to the first grayscale; and an overdriving unit, configured to overdrive the second voltage corresponding to the second grayscale to obtain a first target driving voltage, and provide the first target driving voltage to the display unit.

2. The electronic device as claimed in claim 1, wherein in the relationship curve, the first voltage corresponds to a first transmittance, the second voltage corresponds to a second transmittance, and the first transmittance is the same as the second transmittance.

3. The electronic device as claimed in claim 1, wherein the first target driving voltage is the same as the first voltage corresponding to the first grayscale.

4. The electronic device as claimed in claim 1, wherein the first grayscale is between 245 and 255.

5. The electronic device as claimed in claim 1, wherein the difference between the first grayscale and the second grayscale is between 5 and 70.

6. The electronic device as claimed in claim 1, wherein the voltage generation unit generates a fourth voltage according to a fourth grayscale and generates a fifth voltage according to a fifth grayscale; wherein the fourth grayscale is higher than the fifth grayscale but lower than the second grayscale, and the fourth voltage is higher than the fifth voltage but lower than the second voltage; the grayscale adjustment unit is configured to receive a second display grayscale value, and output the fourth grayscale when the second display grayscale value is equal to the fifth grayscale.

7. The electronic device as claimed in claim 6, wherein the overdriving unit is configured to overdrive the fourth voltage corresponding to the fourth grayscale to obtain a second target driving voltage, and provide the second target driving voltage to the display unit.

8. The electronic device as claimed in claim 6, wherein the second target driving voltage is the same as the fifth voltage corresponding to the fifth grayscale.

9. The electronic device as claimed in claim 6, wherein the fifth grayscale is the lowest grayscale that is adjustable in the display unit.

10. The electronic device as claimed in claim 6, wherein the difference between the fourth voltage and the fifth voltage is between 0.1V and 1V.

11. The electronic device as claimed in claim 6, further comprising:

a data standard unit, electrically connected to the voltage generation unit;

wherein the data standard unit defines the first grayscale, the second grayscale, the third grayscale, the fourth grayscale, and the fifth grayscale according to the relationship curve of the display unit and a gamma curve 2.2.

12. The electronic device as claimed in claim 11, wherein the data standard unit divides the first voltage and the second voltage to obtain voltage values corresponding to other grayscales between the first grayscale and the second grayscale, and divides the fifth voltage and the fourth voltage to obtain voltage values corresponding to other grayscales between the fourth grayscale and the fifth grayscale.

13. The electronic device as claimed in claim 6, wherein the first display grayscale value and the second display grayscale value are comprised in input data received by the grayscale adjustment unit.

14. The electronic device as claimed in claim 1, further comprising:

a dithering unit, electrically connected between the overdriving unit and the display unit;

wherein the dithering unit receives the first target driving voltage comprised in output data from the overdriving unit, and performs a dithering operation on the output data.

15. The electronic device as claimed in claim 1, wherein the voltage generation unit is a P-gamma integrated circuit (IC).

16. The electronic device as claimed in claim 1, wherein the overdriving unit is an overdriving integrated circuit (IC).

17. The electronic device as claimed in claim 1, wherein the grayscale adjustment unit is a white-tracking integrated circuit (IC).

18. The electronic device as claimed in claim 11, wherein the data standard unit is a data integrated circuit (IC).

19. The electronic device as claimed in claim 1, wherein when images displayed by the display unit are static images, the display gray scale value received by the grayscale adjustment unit is equal to the first grayscale, and the grayscale adjustment unit outputs the second voltage corresponding to the second grayscale, the overdriving unit does not overdrive the second voltage corresponding to the second gray scale.

20. The electronic device as claimed in claim 19, wherein the grayscale adjustment unit outputs the second voltage corresponding to the second grayscale to the display unit through a data path.

* * * * *